United States Patent [19]

Johnson

[11] Patent Number: 4,570,670
[45] Date of Patent: Feb. 18, 1986

[54] VALVE

[76] Inventor: Charles D. Johnson, c/o Aramco, P.O. Box 1893, Ras Tanura, Dhahran, Saudi Arabia

[21] Appl. No.: 612,348

[22] Filed: May 21, 1984

[51] Int. Cl.[4] .............................................. F16K 37/00
[52] U.S. Cl. ..................................... 137/553; 251/168; 251/187; 251/193; 251/249.5; 251/329
[58] Field of Search ................ 137/553; 251/148, 187, 251/249.5, 329, 168, 193–195; 116/273, 277

[56] References Cited

U.S. PATENT DOCUMENTS

| | | | |
|---|---|---|---|
| 111,382 | 1/1871 | Richardson | 251/187 |
| 627,395 | 6/1899 | Crist | 116/277 |
| 1,778,070 | 10/1930 | Fisk | 251/249.5 |
| 1,824,490 | 9/1931 | Mare et al. | 251/249.5 |
| 1,921,298 | 8/1933 | Lewis | 251/168 |
| 2,705,610 | 4/1955 | Hjulian | 251/196 |
| 2,786,644 | 3/1957 | Koppl | 251/193 |
| 3,033,516 | 5/1962 | Williams | 251/187 |
| 3,120,944 | 2/1964 | Cogez et al. | 251/329 |
| 3,265,354 | 8/1966 | Anderson | 251/329 |
| 3,420,266 | 1/1969 | Downey | 251/267 |
| 4,130,745 | 12/1978 | Hetzer | 116/267 |
| 4,220,270 | 9/1980 | Szadkowski | 251/249.5 |

Primary Examiner—A. Michael Chambers
Attorney, Agent, or Firm—Cahill, Sutton & Thomas

[57] ABSTRACT

A gate valve with inlet and outlet body portions with annular valve seats thereon and a gate assembly movable between open and closed positions between said body portions and carrying sealing rings in opposite faces thereof adapted to be brought into sealing relationship with said valve seats when the valve is open and when the valve is closed. The body portions of the valve have a plurality of bolts passing therethrough which are adapted to threadably engage the sealing rings to uniformly draw the rings toward their respective valve seats to clamp a gasket structure between a ring and its seat in positive sealing relationship. The bolts are adapted to be withdrawn from the rings to permit the gate assembly to be moved between open and closed positions. The bolts have washers associated therewith which engage the gasket structure when the bolts are withdrawn from sealing rings to move the gasket structure out of contact with the gate assembly to prevent abrasion of the gasket structure when the gate assembly is moved. The gate assembly is held and guided by a frame which has a screw drive contained therein for moving the gate assembly. Indicators disposed exteriorly of the valve are actuated by permanent magnets carried by the gate assembly to indicate whether the valve is open or closed.

16 Claims, 9 Drawing Figures

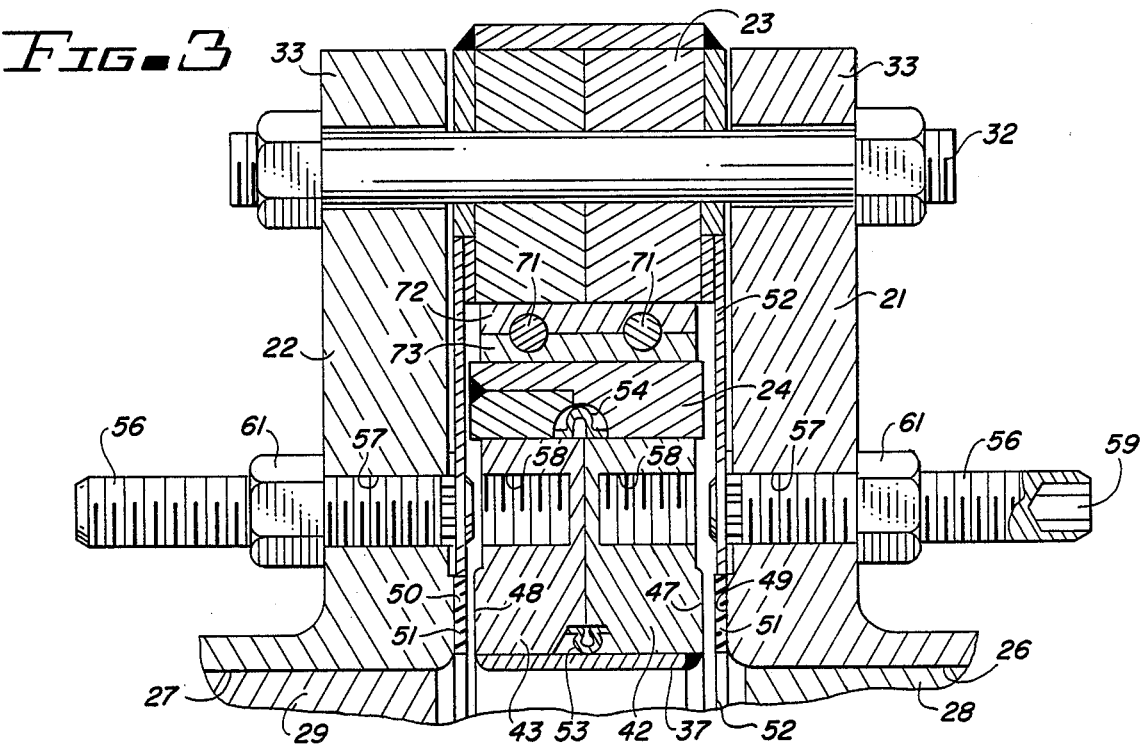
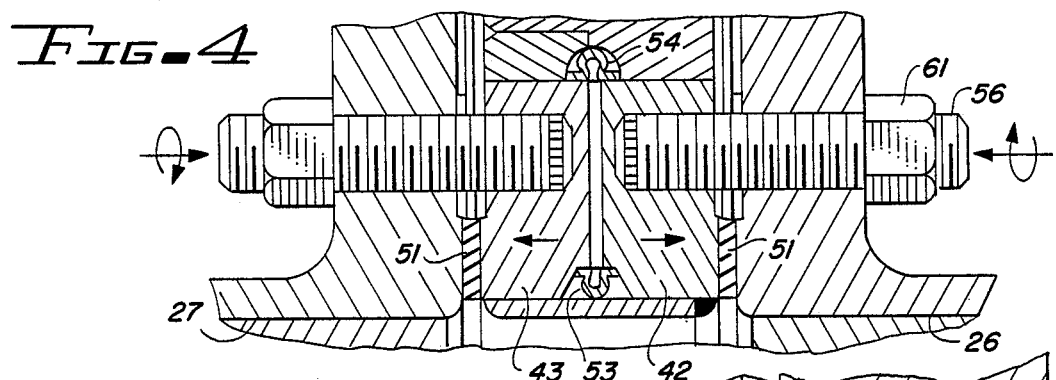
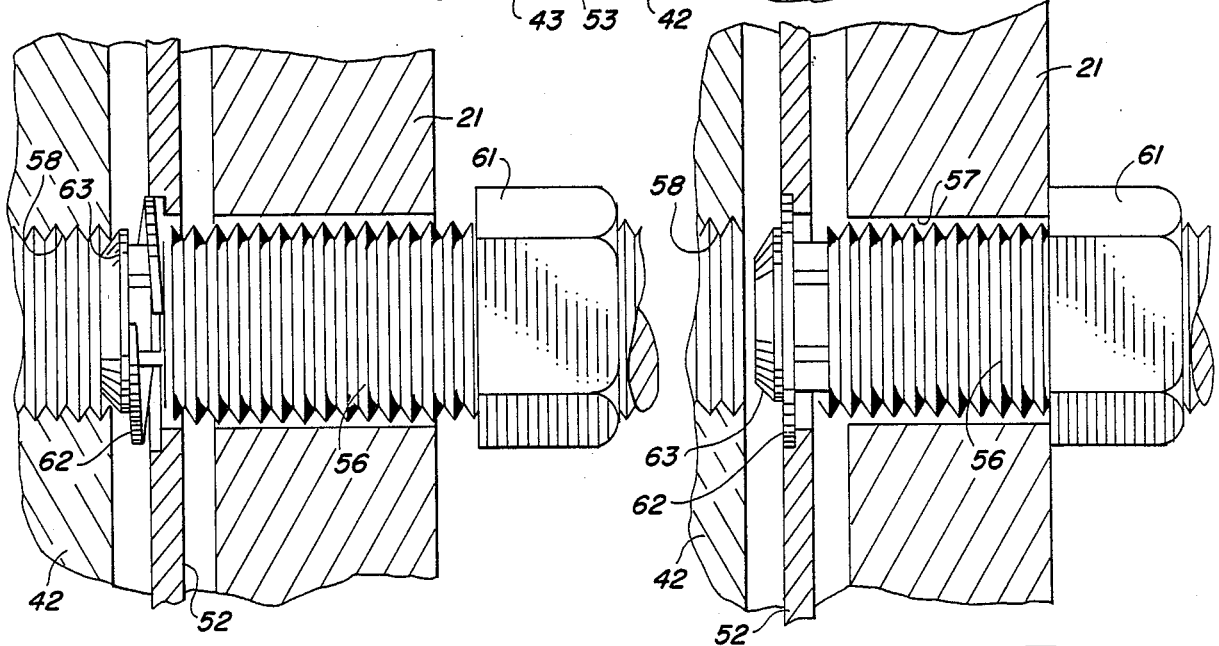

VALVE

TECHNICAL FIELD

This invention relates to valves employed to shut off the flow of fluid through portions of a pipeline complex to isolate sections of the complex for maintenance or repair.

BACKGROUND ART

Pipe used in pipelines for transporting fluids, such as oil and gas, is usually quite large in diameter, for example, anywhere from one foot to four feet. The gate valve is one form of valve commonly used in pipelines. Gate valves employed heretofor for isolating sections of the pipe of this large diameter have been massive, expensive devices and have not been entirely reliable. The following United States patents describe gate valve structures which can be considered to be representative of the prior art:

U.S. Pat. No. 3,069,129. H. M. Grove, granted Dec. 18, 1962 for "Valve Construction having Fluid Pressure and Spring Bias Seals";

U.S. Pat. No. 3,367,635, R. Fortune, granted Feb. 6, 1968 for "Slide Gate Valves";

U.S. Pat. No. 3,575,377, S. E. Carlton, granted Apr. 20, 1971 for "Closure Seals for Gate Valve and Method";

U.S. Pat. No. 4,062,516, H. M. Grove, granted Dec. 13, 1977 for "Valve Construction"; and U.S. Pat. No. 4,275,866, D. W. Jamar, granted June 30, 1981 for "Operator for a Gate Valve".

Each of the valves disclosed in these patents suffers from a deficiency which is common to most gate valves. Because the mating and sealing surfaces within the valve are in contact when the gate is moved to and from its closed position, friction galling of these surfaces frequently occurs. This galling destroys the intergrity or uniformity of the valve surfaces and impairs the ability of the valve components to form a perfect seal. Leaky valves are the result, and this simply cannot be tolerated in pipeline installations.

When an isolation valve leaks in its "closed" position it complicates and greatly increases the cost of performing the desired repair or maintenance of the isolated sections of the complex. Repairing a pipeline section or component into which oil or gas is leaking is hazardous and requires great care on the part of the work crew. Often, to shut off the flow through a leaking isolation valve, it is necessary to shut down or isolate other portions of the complex to adequately eliminate or divert the leaking fluids. This can be very costly if it reduces the overall capacity of the pipeline to deliver product.

Another deficiency which is largely inherent in gate valve structures is the limited forces that are available to seat sealing surface against sealing surface in the valve. This is because these sealing surfaces are parallel or nearly parallel to the plane of movement of the valve gate. The patents to Fortune and Carlton, identified above, are addressed to this problem and disclose fluid pressure systems for increasing the seating forces of the valves. Fortune requires a separate source of pressurized fluid and therefore utilizes an expensive installation really not suited for isolated locations, of which there are many in a pipeline complex. Carlton relies on differential forces derived from the pressure of the fluid in the pipeline, which arrangement can generate only limited sealing forces. Consequently, Carlton must rely on fragile rubber O-rings to effect a seal.

There is a need, therefore, for a rugged, reliable, yet relatively inexpensive gate valve capable of effecting an absolute shut off of a pipeline.

DISCLOSURE OF INVENTION

At the heart of the present invention is the concept of mechanically seating a sealing ring against body portions of the valve by means of a plurality of manipulating, or sealing, bolts extending from the sealing ring through the body portion of the valve to the exterior of the valve where the bolts can be manipulated by the operator to effect the desired level of seating forces on the sealing surfaces of the valve. In the prefered form of the valve the movable gate assembly includes two pairs of sealing rings, one pair to be operative when the valve is open and the other pair to be operative when the valve is closed. One ring of each pair cooperates with the inlet body portion which is actually a flange-like member on the inlet pipe. The other ring of each pair cooperates with the flange-like member on the outlet pipe.

The sealing forces, which can be considerable in this valve, act solely within or between the respective sealing rings and the body flanges. This means that other support components of the valve, such as a support and guide frame for the movable gate assembly, do not carry any of these sealing forces and can, therefore, be made of relatively light and inexpensive construction.

It is also contemplated that the valve will be equipped with gaskets positioned between the sealing surfaces of the sealing rings and the flange-like body portions. These gaskets are carried by support sheets which are engagable by washers carried on the bolts. The arrangement is such that when the manipulating bolts are withdrawn from engagement with the sealing rings on the gate assembly to permit the gate to be moved from one position to another, the washers on the ends of the bolts contact the support sheets for the gaskets and pull the gaskets away from the sealing rings. By this arrangement galling of the gaskets is precluded because the moving surfaces of the gate assembly are not in contact with the gaskets until the gate position has been fixed and the manipulating bolts are again associated with the sealing rings.

It is also contemplated that the frame that supports and guides the movable gate assembly will have associated therewith one or more threaded drive shafts for effecting reciprocating movement of the gate assembly. These drive shafts are turned by means of a worm shaft also associated with the frame and having an end region accessible from outside the frame by a tool manipulating the valve.

It is further contemplated that the valve will have associated therewith at least one indicator capable of identifying to an observor the position occupied by the gate assembly within the valve. In accordance with this invention that indicator is actuated by a permanent magnet member carried by the gate assembly within the valve.

BRIEF DESCRIPTION OF THE DRAWINGS

In the following detailed description of the invention reference is made to the accompanying drawings wherein:

FIG. 3 is a horizontal sectional view taken generally as indicated by line 3—3 in FIG. 1;

FIG. 4 is a sectional view similar to FIG. 3, but showing the valve components in the sealed position;

FIGS. 5 and 6 are enlarged views of the valve components illustrated in FIG. 3;

BEST MODE FOR CARRYING OUT THE INVENTION

Figure 1:
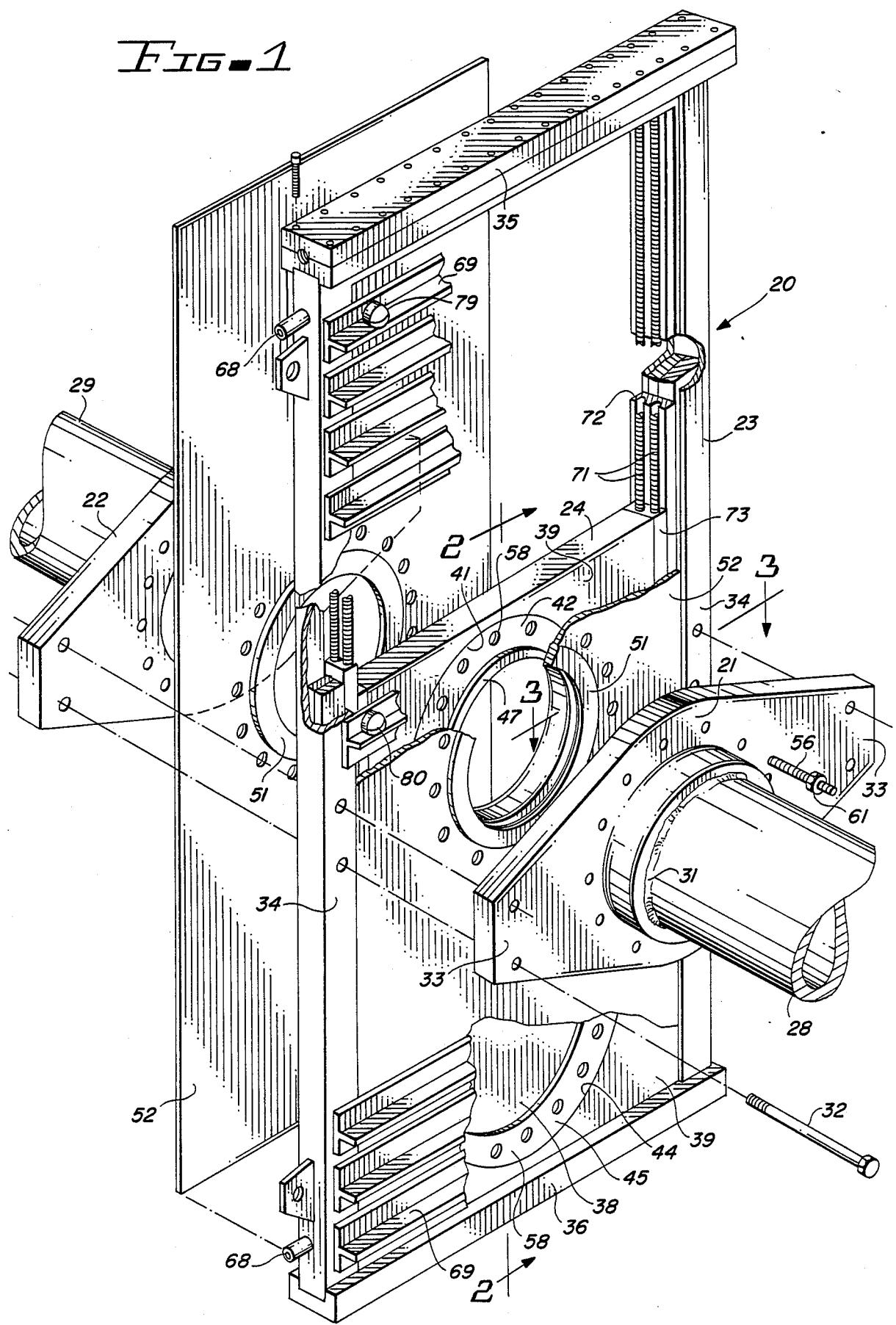
FIG. 1 is an exploded perspective view of a gate valve embodying this invention.

Referring particularly to FIG. 1 the valve of this invention, which is indicated generally by reference numeral 20, comprises as its major components a support and guide frame 23 and a slidable gate assembly 24 which is carried and guided by frame 23. Pipe-to-valve connection/support flanges 21 and 22 are oppositely disposed and have axially aligned bores 26 and 27, respectively, therein to receive and axially position an inlet pipe 28 and an outlet pipe 29. The inlet and outlet pipes provide aligned passageways entering and leaving the body of the valve. Flanges 21 and 22 are preferably welded, as indicated at 31, to their respective pipes 28 and 29.

Inlet and outlet flanges 21 and 22 are connected to frame 23 by means of support bolts 32 passing through flange lugs 33 and oppositely disposed side arms 34 of frame 23. Frame 23 also includes oppositely disposed top and bottom arms indicated generally at 35 and 36, respectively.

The valve gate assembly 24 is positioned for sliding movement between side arms 34 of frame 23 in a plane transverse to the bores 26 and 27 of inlet and outlet flanges 21 and 22. Gate assembly 24, during normal operation, is disposed in either one of two positions. In its, so called "open" position an opening or bore 37 provided in the gate assembly is aligned with the bores of the inlet and outlet flanges 26 and 27 to permit unimpeded fluid flow through the valve. Gate assembly 24 is movable within frame 23 to its other, or "closed", position in which that portion of the valve assembly indicated at 38 presents a solid obstruction to flow through the valve.

Figure 2:
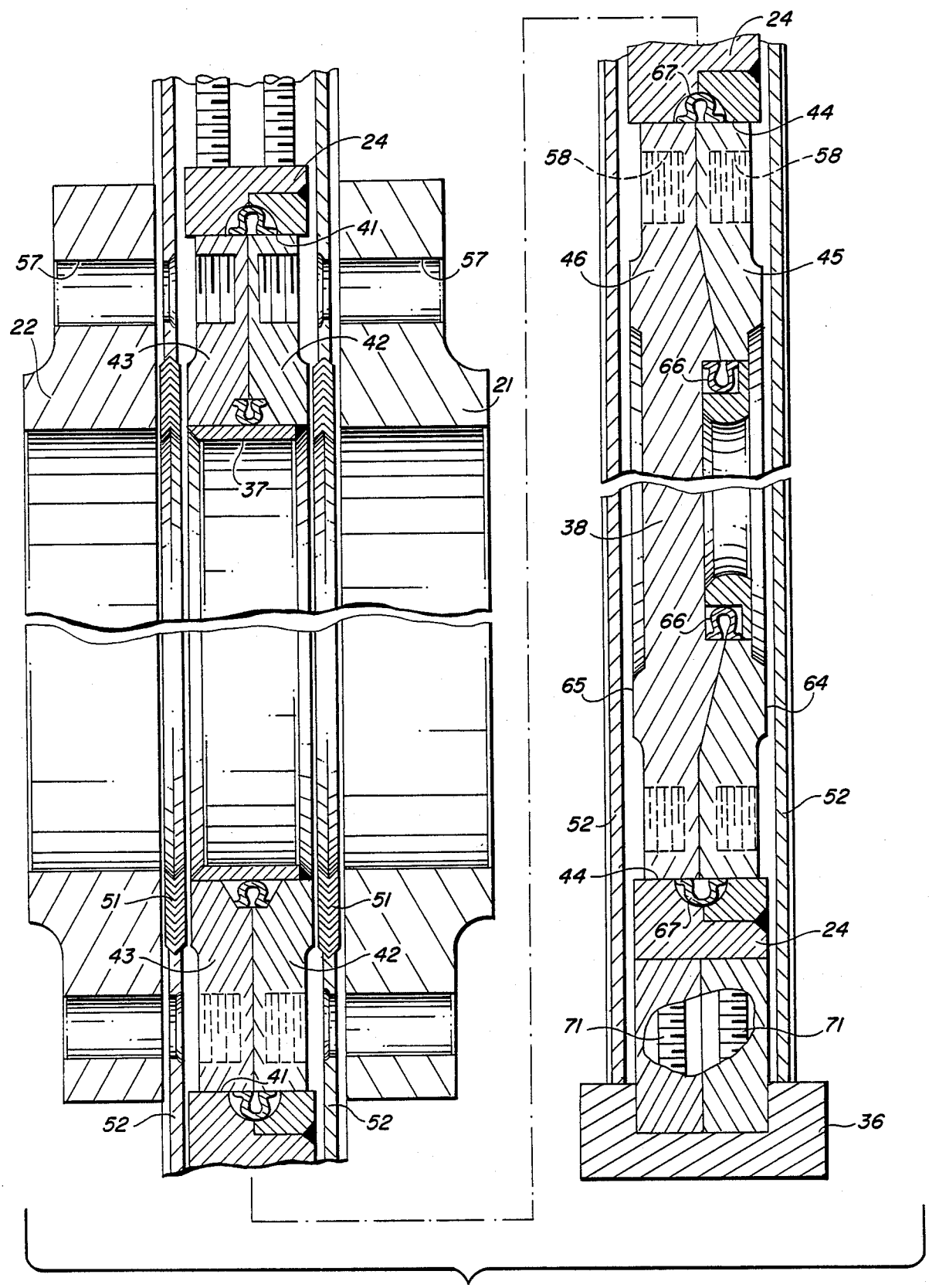
FIG. 2 is a vertical sectional view through the valve taken generally as indicated by the line 2—2 in FIG. 1, with portions broken away to foreshorten the illustration.

The valve of this invention is equipped with means for assuring positive sealing of the valve both in its "open" and its "closed" positions. To this end the valve gate assembly 24 includes a gate plate 39 having one bore 41 therethrough for supporting a pair of upper, or "open" sealing rings, 42 and 43 respectively, and a second bore 44 for supporting a lower, or "closed" sealing ring 45 and a sealing disc 46 (See FIG. 2). Sealing rings 42 and 43 are disposed in a back to back relationship and present annular sealing surfaces 47 and 48 toward seats 49 and 50 on the inner surfaces of inlet and outlet flanges 21 and 22 respectively. Positioned at seats 49 and 50 of flanges 21 and 33 are a pair of annular gaskets 51 which are preferably of the long life type made from spirally wound V-shaped metalic spring material. Each of the gaskets 51 is carried by a support and seal sheet 52, each of which is sealingly secured at its periphery to frame 23. Seal sheets 52 serve as side covers for that portion of the valve containing the slidable gate assembly 24. Gaskets 51 are adapted to be compressed between the sealing surfaces 47 and 48 on sealing rings 42 and 43 and seats 49 and 50 on flanges 21 and 22. It is to be noted that sealing rings 42 and 43 are connected only by inner annular flexible sealing means 53 and an outer annular flexible sealing means 54 so that the sealing rings 42 and 43 can be axially separated, i.e. pulled apart so that they can be moved into sealing relationship with seats 49 and 50, respectively, and gaskets 51 interposed therebetween. Inner and outer sealing means 53 and 54 are preferably formed of U-shaped annuluses formed of spring metal and welded to the sealing rings 42 and 43.

Movement of sealing rings 42 and 43 to seal the valve components in their open position is effected by a series of manipulating, or sealing, stud bolts 56. There are two annular sets of bolts 56, one set for each of the body flanges 21 and 22 of the valve. Flanges 21 and 22 have a series of passages 57 bored therein through which stud bolts 56 are free to pass to be threadably received in recesses 58 provided in sealing rings 42 and 43. The outer ends of bolts 56 are preferably provided with sockets 59 adapted to receive a tool for manipulating the bolts 56. When bolts 56 have been threaded into the recesses 58 in sealing rings 42 and 43 a series of nuts 61, one for each bolt 56, are tightened against the outer surfaces of flanges 21 and 22 the bolts pull sealing rings 42 and 43 apart and into engagement with gaskets 51 (See FIG. 4).

As with most mechanical devices employing multiple bolt securing means, the nuts 61 on bolts 56 are preferably tightened in oppositely disposed pairs to assure uniform seating of sealing rings 42 and 43 against gaskets 51 and the flange seats 49 and 50.

To unseal seal rings 42 and 43 in preparation for movement of the valve gate assembly 24 to its "closed" position, nuts 61 are first loosened and then bolts 56 are backed out of the threaded recesses 58 in sealing rings 42 and 43. It is to be noted that each bolt 56 carries at its inner end a split ring washer 62 which is threadably received over threaded portions of bolts 56 but is engaged by a head 63 on the inner end of bolt 56 when the bolt is pulled away from its sealing ring. The purpose of the washers 62 on bolts 56 is to engage the gasket carrying seal sheets 52 and pull them toward the flanges 21 and 22 so as to seal the openings in seal sheets 52 through which the bolts 56 pass and to withdraw the gaskets 51 from contact with the sealing surfaces 47 and 48 on sealing rings 42 and 43. This retraction of bolts 56 is accomplished by tightening nuts 61 on the bolts after the bolts have been released from their respective sealing rings 42 and 43. With bolts 56 retracted from sealing rings 42 and 43 the gaskets 51 moved out of the way so that they will not be galled by movement of the sealing rings, movement of the gate assembly 24 to its closed position can be commenced.

When the valve 20 has been closed, i.e. the gate assembly 24 has been moved to a position in which the solid portion 38 of the assembly is aligned with the bores 26 and 27 of the inlet and outlet flanges, the valve can then be sealed in this position in the same manner described above in connection with sealing the valve in its "open" position. The first step in the sealing procedure is to loosen nuts 61 on manipulating bolts 56 so that these bolts can be inserted and threaded in threaded recesses 58 in sealing rings 45 and sealing disc 46. Thereafter, nuts 61 are tightened to separate ring 45 and disc 46 so that their respective sealing surfaces, 64 and 65, are brought to bear against gaskets 51 to seal the gaskets against flange seats 49 and 50, respectively. Like the sealing rings for the "open" position, the sealing members for the "closed" position have inner and outer flexible sealing means 66 and 67 connecting sealing ring 45 with sealing disc 46.

From the foregoing it should be apparent that manipulation of the open sealing rings 42 and 43 or manipulation of the closed sealing ring 45 and its complimentary sealing disc 46 by means of manipulating bolts 56 and the nuts 61 provides for the creation of highly effective seals against inlet flange 21 and outlet flange 22. The amount of sealing force to be applied is entirely at the discretion of the operator of the valve and merely depend upon how tightly he tightens the nuts 61 on the manipulating bolts 59. If after manipulation of the valve and initial tightening of nuts 61 there is observed to be a leak in the valve assembly, the leak can be corrected by simply applying additional forces through the nut 61 bolt 56 combination.

The valve may, if desired, be equipped with inspection drain nipples 68 positioned adjacent to the extremities of the frame 23. Nipples 68 permit the interior of the valve, i.e. the space between seal sheets 52, to be opened to the atmosphere. By opening the lowermost nipple 68 the operator of the valve can detect the presence of liquid in the interior of the valve, which would indicate that one of the valve seals is leaking. The leaking condition can be corrected by applying additional torque to the nuts to increase the force transmitted through manipulating bolts 56.

Figure 7:
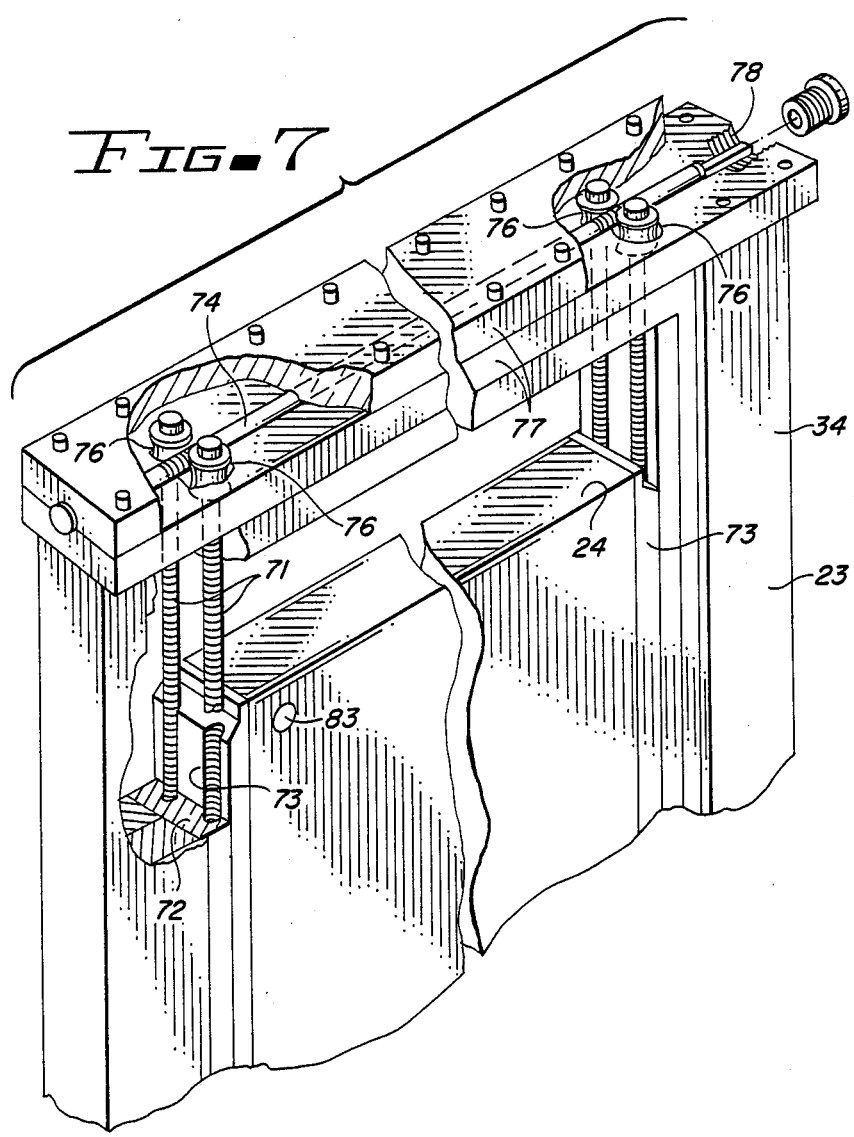
FIG. 7 is a perspective view of the upper portion of the valve of FIG. 1 with portions broken away to illustrate the mechanism for driving the valve gate.

It should be noted, however, that with the valve in its "closed" position, detection of liquid in the valve interior through a nipple 68 does not necessarily indicate that oil is being allowed to escape to outlet pipe 29. There are two sets of seals in the valve of this invention to provide double protection against leakage in the "closed" position. So even if the inlet seal provided by ring 45 permits some oil to enter the interior of the valve, the outlet seal provided by disc 46 is available to prevent leakage into outlet pipe 29. It is to be noted that the forces transmitted between the flanges 21 and 22 and the sealing rings engaged by the manipulating bolts 56 are confined solely to these components of the valve. In other words, other portions of the gate assembly 24 and the supporting and guiding frame 23 are not called upon to carry any of these sealing forces. Thus, the latter components can be made from light weight materials so as to reduce both weight and the cost of the finished valve. It may be desirable, if frame 23 of the valve is of particularily light construction to stiffen the frame with transverse T-bars 69 which can be welded in place to the side arms 34 of the frame. The mechanism for moving the gate assembly 24 can also be of relativley light construction because it is called upon solely to move the gate assembly against the weight of that mechanism and is not called upon to produce or oppose any of the forces utilized in effecting the seals of the valve. This drive mechanizm for the gate assembly 40 is best illustrated in FIGS. 1 and 7. The principal components of the drive assembly are housed in the side arms 34 of the frame 23 and comprise two pairs of threaded drive shaft 71 positioned between a groved guide plate 72, which forms part of each frame side arm 34, and a threaded follower plate 73 secured to side edges of the gate plate 39. It can be appreciated that when the threaded drive shafts 71 are rotated the threads thereon engage follower plate 73 and propel gate assembly 24 along the side arms 34 of the valve frame 23. The means for rotating drive shafts 71 preferably takes the form of a worm shaft 74 positioned between gears 76 secured to the ends of drive shaft 71. With this arrangement a single worm shaft 74 cooperating with four gears 76 on the four drive shafts 71 can cause all four drive shafts to rotate in unison in the proper direction to move the valve gate assembly 24. The worm shaft 74 is preferably housed in routed out regions of split halves 77 in the upper arm 35 of frame 23. The end regions of the arm halves 77 are hollowed out, as is indicated at 78, so that a tool may be inserted therein for engagement with an end of worm shaft 74. Either a hand or power tool can be used for this purpose and because the drive ends of work shaft 74 are recessed within the routed out regions 78 access thereto other than with a specially designed tool is discouraged. When the valve is in either its "open" or "closed" position the routed out regions can be closed by the means of a threaded plug to further discourage manipulation of the valve.

Figures 8, 9:
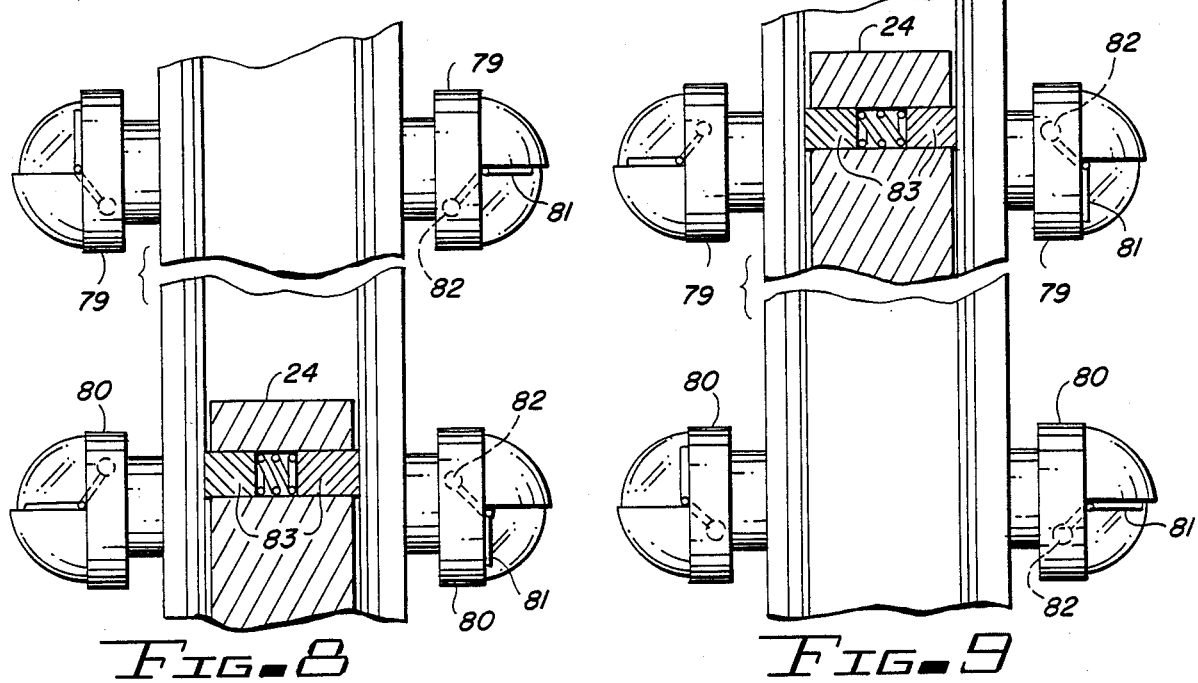
FIGS. 8 and 9 are side elevational views, partially in section, of a portion of the valve illustrating apparatus for indicating the position of the gate in the valve.

Because the position of the gate assembly within frame 23 cannot be discerned from outside the valve 20 it is desirable that the valve be equipped with indicator means to allow an observor to assertain whether the gate is in an "open" or "closed" position. The preferred form of indicator for the valve is illustrated in FIGS. 8 and 9. The indicator preferably includes two displays, one of which, 79, is disposed within an upper region of frame 23 and the other which, 80, is disposed near the middle of frame 23. Each display 79 and 80 is equipped with a movable indicia 81 having an actuating number 82 connected therewith. The actuating members 82 include a magnetically attractable portion which can be influenced by a permanent magnet 83 carried in an upper corner region of the valve gate assembly 24 (See FIG. 7).

Operation of the displays 79 and 80 is illustrated in FIGS. 8 and 9. With the valve gate assembly in its lower, or "open" position, magnet 83 is positioned to influence actuating member 82 on the lower display 80. This causes indicia 81 in display 80 to display the color, red, an "O", or the word "open" to indicate to an observor that the valve is in its open postition. Display 79 is so constructed that when its actuating member 82 is not influenced by magnet 83 its indicia 81 displays the same indication as display 80 when the latter is under the influence of magnet 83. Thus, with the gate assembly 24 in the position shown both displays 79 and 80 give an indication that the valve is in its "open" positions. Now when valve gate 24 is moved upwardly toward the "closed" position of the gate, magnet 83 is moved away from display 80 and the actuating member 82 of display 80, being no longer under the influence of magnet 83, falls under its own weight to shift the position of indicia 81 of display 80 to indicate a different condition of the valve. This indication might be in the form of a display of a green color, or the word "closed", etc,. Until magnet 83 is brought into the vicinity of upper display 79 its indicia 81 continues to display an indication of an "open" condition but when the valve gate 24 is fully positioned in its "closed" position magnet 83 is then alongside display 79 and influences the actuating member 82 of the display 70 to change the position of indicia 81 therein to the green or "closed" position indication. With the gate 24 in this position both displays 79 and 80 now indicate the condition of the valve.

The use of two displays, 79 and 80, in the indicating system is particularily advantageous. It will be noted that the indicator 81 on the two displays 79 and 80 will give the same signal only when the valve gate assembly 24 is in either its "open" or its "closed" position. If the gate 24 is displayed in either direction away from one or the other of these positions the two displays will present different signals indicating that the gate is out of position. If desired, the displays 79 and 80 can be duplicated on the opposite face of the valve frame 23 so that the displays can be read from opposite sides of the valve. It should be understood that any members between the magnet 83 and the displays 79 and 80, such as the seal sheet 52, should be made of non-magnetic material, such as aluminum or stainless steel, so as not to shunt the magnetic force eminating from permanent magnets 83.

From the foregoing it should be apparent that this invention enables truly leak-proof isolation valves to be constructed economically for reliable, lengthy service. It is acknowledged that the procedure for converting the valves from "open" to "closed" position, and vice versa, is more complex and time consumming than with some valves of the prior art. But this added complication is of small consequence for a valve, such as an isolation valve, which is actuated infrequently. And this inconvenience is more than offset by the positive, leak-proof seating of the valve which the invention affords.

This invention has been described in reference to a gate valve 20 in which supporting and guiding frame 23 positions the gate assembly 24 for up and down movements in a vertical plane. The invention can, of course, be practiced in valves having a different orientation. There are no inherent limitations which would preclude the valve being positioned such that its gate assembly moved horizontally, for example, or in other than a vertical plane.

What is claimed is:

1. A gate valve comprising inlet and outlet body portions having aligned passageways therein, at least one of said body portions having a seat surrounding its passageway, gate means movable between said body portions transversely of said passageways between open and closed positions, said gate means having a sealing ring carried thereon, and a plurality of bolts extending through said one body portion and threadably received in said sealing ring for moving said sealing ring into sealing relationship with said seat, said bolts being retractable from engagement with said sealing ring to permit movement of said gate means.

2. The valve of claim 1 wherein said sealing ring is movably carried by said gate means.

3. The valve of claim 2 further comprising a seat on the other of said body portions, a second sealing ring carried by said gate means coaxially positioned with respect to first named sealing ring, and a plurality of bolts extending through said other body portions and threadably received in said second sealing ring for moving said second sealing ring into sealing relationship with the seat on said other body portion.

4. The valve of claim 1 wherein said sealing ring is aligned with the passageways when said gate means is in its closed position, and said valve further comprises a second sealing ring carried by said gate means and adapted to be aligned with the passageways when said gate means is in its open position, said second sealing ring also being adapted to be threadable engaged by said bolts and moved into sealing relationship with said seat.

5. The valve of claim 4 wherein said first and second sealing rings are movably carried by said gate means.

6. The valve of claim 1 further comprising a gasket interposed between said seat and said sealing ring, means for mounting said gasket adjacent said one body portion and means for moving said gasket out of contact with said sealing ring when said bolts are retracted.

7. The valve of claim 6 wherein the mounting means for said gasket comprises a sheet extending around said gasket, said sheet having openings therein permitting passage of said bolts for engaging said sheet when the bolts are retracted from said sealing ring.

8. The valve of claim 1 further comprising frame means secured to said body portions, said frame means being adapted to retain and guide said gate means for movement between its open and closed positions, at least one threaded drive shaft carried by said frame means for moving said gate means, and means for rotating said drive shaft.

9. The valve of claim 8 wherein there are a pair of drive shafts along opposite sidearms of said frame and a worm shaft extending along another arm of said frame between said pair of drive shafts for imparting rotation to said drive shafts.

10. The valve of claim 9 further comprising a housing on said frame for containing said worm shaft and providing limited access thereto.

11. The valve of claim 1 further comprising an indicator positioned exteriorly of the valve for indicating whether the gate means is in its open or closed position, and permanent magnet means carried by said gate means for actuating said indicator.

12. The valve of claim 1 further characterized by said inlet and outlet body portions comprising flange means for receiving inlet and outlet pipes respectively, said flange means having outwardly extending lugs thereon, frame means adapted to retain and guide said gate means for movement between its open and closed positions, and bolt means for connecting said lugs to said frame means.

13. The valve of claim 12 wherein said frame means has oppositely disposed side arms and oppositely disposed top and bottom arms, said lugs being connected to said side arms.

14. The valve of claim 13 further comprising at least one threaded drive shaft positioned adjacent one of the side arms of said frame means for moving said gate means, and means for rotating said drive shaft.

15. The valve of claim 14 wherein the means for rotating said drive shaft is a rotatable worm shaft carried by said top arm of said frame means.

16. The valve of claim 15 wherein said worm shaft is disposed within the top arm of said frame means so that access to the worm shaft is limited.

* * * * *